No. 696,923. Patented Apr. 8, 1902.
W. BAISCH.
MACHINE FOR FORMING BARS OR SIMILAR ARTICLES.
(Application filed July 12, 1901.)
(No Model.)

Witnesses:
F. G. Harder.
Jos. Schnitzler

Inventor:
Wilhelm Baisch
per Martin Schmetz
Attorney.

United States Patent Office.

WILHELM BAISCH, OF STOLBERG II, RHINELAND, GERMANY.

MACHINE FOR FORMING BARS OR SIMILAR ARTICLES.

SPECIFICATION forming part of Letters Patent No. 696,923, dated April 8, 1902.

Application filed July 12, 1901. Serial No. 68,097. (No model.)

*To all whom it may concern:*

Be it known that I, WILHELM BAISCH, engineer, a subject of the King of Prussia, German Emperor, residing at Stolberg II, Rhineland, in the Kingdom of Prussia, Empire of Germany, have invented certain new and useful Improvements in Machines for Forming Bars or Similar Articles by Pressing Plastic Metals Through Oppositely-Arranged Dies Simultaneously; and I do hereby declare the following to be a full, clear, and exact description of the invention, such as will enable others skilled in the art to which it appertains to make and use the same.

My present invention relates to machines for forming bars out of plastic metals, becoming so by heating them or being so in their natural state, and particularly to such in which after the plastic metal being introduced into the press-cylinder both dies enter same from its opposite ends, and the plastic metal will be pressed in form of bars of any cross-section through said dies. By doing so much waste of material, dangers of damaging the machine, and consequent loss of time and money is avoided, because the plastic metal is subjected to the pressure of the dies in a more advantageous manner than in the older machines of this class.

Figure 1:
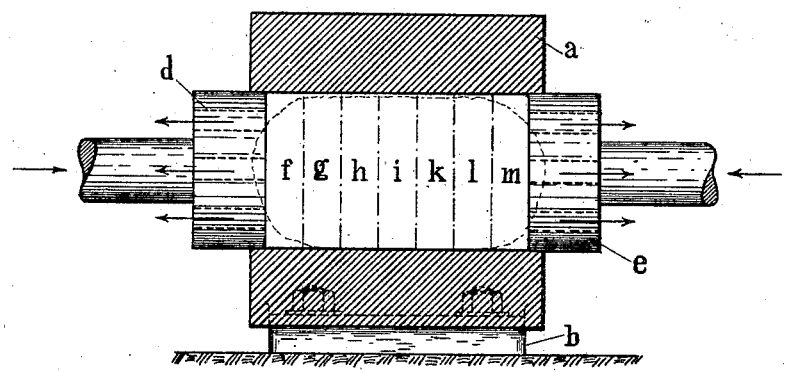
Figure 2:
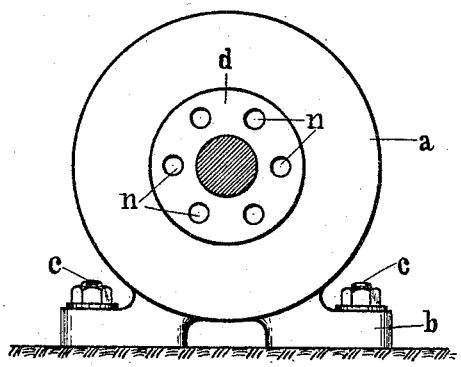

In the accompanying drawings, Figure 1 is a cross-section of the press-cylinder, showing both dies just entering the same. Fig. 2 is an end view of the same parts.

The press-cylinder $a$ is provided with heavy feet $b$ and securely bolted down by means of the bolts $c$. Into this press-cylinder is introduced a charge of the heated plastic metal, having approximately the shape as indicated by the dotted line in Fig. 1; but as soon as the dies $d$ and $e$ have entered the press-cylinder a little distance said plastic metal will fill the whole inside of the press-cylinder. The dies $d$ and $e$ may be advanced into the press-cylinder against the resistance of the plastic metal by means of steam or hydraulic pressure or by any other means, and as same do not form a part of my invention such means are not shown here. Supposing the plastic metal being divided into any number of equal layers, say seven—namely, $f$, $g$, $h$, $i$, $k$, $l$, and $m$—then the two outer layers $f$ and $m$ will in the first place be obliged to leave the inside of the press-cylinder in the form of bars through the ducts $n$ of the dies $d$ and $e$ as soon as the dies $d$ and $e$ advance. In a like manner the adjacent layers $g$ and $l$, and after them the layers $h$ and $k$, will leave the press-cylinder through the dies, while perhaps a very small fraction of the middle layer $i$, according to the ability of the metal under consideration to retain the heat, needs to be removed as waste from the press-cylinder $a$ before a new charge is introduced. The withdrawal of the waste is effected by drawing either the die $d$ back and advancing the die $e$, or vice versa, or by keeping both dies for the time being stationary and moving the press-cylinder $a$ sidewise until the waste of the charge clears it and then remove the waste. The disposition of press-cylinder $a$ and the dies $d$ and $e$ can also be made in such a way that one of the dies remains stationary while the other executes the necessary motion; but the effect is the same as if both dies were moving, as the plastic metal will leave the press-cylinder through both dies in the same manner as explained above. It is obvious that by the aid of this arrangement the introduced charge can be worked to a far greater advantage than in the older machines of this class, as it is most natural that the charge will retain its heat near its middle longer than at its ends, and as the forming of the bars is initiated at both ends of the charge simultaneously the dies will encounter at each point of the whole length of the press-cylinder metal of about the same temperature, and for this reason the whole or approximately so of the charge will be converted into bars or similar articles of the most equal density with the least amount of energy and with the least waste of material, as by some experience the charge can be so proportioned that little or nothing of it needs to be removed from the press-cylinder as waste. In the old machines of this class working with one die only a small charge is possible and an excessive waste of energy and material unavoidable, as the converting of the charge into bars is taking place at one end of the charger only, and by doing so the other end of the charge will have ample time to cool off to such a degree that it is impossible to convert it into bars or similar articles, and therefore increases the dangers to the plant, requires an excessive amount of energy, and must after all be removed from the cylinder as waste.

The ducts in the dies $d$ and $e$ may have any desired cross-section to suit any work in hand.

I claim—

1. In a machine for forming bars or similar articles by pressing plastic metals simultaneously through dies, the press-cylinder open at both ends, two dies working in opposite directions to each other and capable of entering said press-cylinder to act upon the plastic metal from opposite sides, and ducts in said dies arranged at points between the perimeter and the rod of each die through which the forming articles simultaneously leave the inside of the press-cylinder.

2. In a machine of the kind described the combination of a press-cylinder with open ends and the oppositely-arranged dies provided with ducts at points between the perimeter and the rod of each die and capable of approaching the charge in the press-cylinder simultaneously from opposite directions, substantially as shown and described.

In testimony that I claim the foregoing as my invention I have signed my name in presence of two subscribing witnesses.

WILHELM BAISCH.

Witnesses:
   C. E. BRUNDAGE,
   H. QUADFLIEZ.